(12) United States Patent
Mazoyer

(10) Patent No.: US 9,809,271 B2
(45) Date of Patent: Nov. 7, 2017

(54) WHEELED VEHICLE, ESPECIALLY FOR CHILDREN

(71) Applicant: ID DEVELOPMENT LIMITED, Tsim Sha Tsui (HK)

(72) Inventor: Joseph Mazoyer, Lyons (FR)

(73) Assignee: ID Development Limited, Tsim Sha Tsui (HK)

( * ) Notice: Subject to any disclaimer, the term of this patent is extended or adjusted under 35 U.S.C. 154(b) by 0 days.

(21) Appl. No.: 15/279,500

(22) Filed: Sep. 29, 2016

(65) Prior Publication Data
US 2017/0106932 A1    Apr. 20, 2017

(30) Foreign Application Priority Data
Oct. 16, 2015   (FR) ...................................... 15 59851

(51) Int. Cl.
  *B62K 15/00*  (2006.01)
  *B62K 5/08*   (2006.01)
  *B62K 3/00*   (2006.01)

(52) U.S. Cl.
  CPC .............. *B62K 15/00* (2013.01); *B62K 3/002* (2013.01); *B62K 5/08* (2013.01)

(58) Field of Classification Search
  CPC ........ B62K 21/00; B62K 15/00; B62K 3/002; B62K 15/006; B62K 21/12; B62K 5/05
  See application file for complete search history.

(56) References Cited

U.S. PATENT DOCUMENTS

| | | | | |
|---|---|---|---|---|
| 7,954,831 B1 * | 6/2011 | Yeh | ........................ | B62K 3/002 16/429 |
| 8,696,000 B1 * | 4/2014 | Chen | ...................... | B62K 3/002 280/11.28 |
| 8,985,602 B2 * | 3/2015 | Chan | ...................... | B62K 3/002 280/87.041 |
| 9,027,944 B2 * | 5/2015 | Johnson | ................. | B62K 3/002 280/87.041 |
| 9,272,739 B2 * | 3/2016 | Zaid | ....................... | B62K 3/002 |
| 9,511,812 B2 * | 12/2016 | Chen | ...................... | B62K 21/00 |
| 2009/0160150 A1 * | 6/2009 | Johnson | ............... | B62K 15/006 280/87.041 |

(Continued)

*Primary Examiner* — Hau Phan
(74) *Attorney, Agent, or Firm* — Defillo & Associates, Inc; Evelyn A Defillo

(57) ABSTRACT

This vehicle is equipped with front and rear wheels and comprises a platform, a foldable/unfoldable steering column and a locking mechanism. According to the invention: the platform includes a cylindrical well (13), the axis of which is tilted according to an angle from 30° to 60° towards the rear of this platform (2). The steering column has a lower bent portion, connected to a cylindrical base (22) intended to be engaged into the well (13) with pivoting capability, the axis of this base (22) forming, with the axis according to which the remainder of the steering column (5) extends longitudinally, an angle complementary to 180° with the angle formed by the axis of the well (13). The locking mechanism includes a first device (16, 17; 27, 32) for angularly blocking the base (22) in the well (13), in the unfolding position of the steering column, and a second device (16, 18; 27, 32) for angularly blocking the base (22) in the well (13), in the folding position of the steering column.

5 Claims, 3 Drawing Sheets

(56) References Cited

U.S. PATENT DOCUMENTS

| | | | |
|---|---|---|---|
| 2012/0098238 A1* | 4/2012 | Wang | B62K 3/002 280/655.1 |
| 2016/0009330 A1* | 1/2016 | Yeh | B62K 5/05 280/87.041 |
| 2016/0129965 A1* | 5/2016 | Baron | B62H 7/00 280/87.041 |
| 2016/0152296 A1* | 6/2016 | Eckert | B62K 21/12 280/87.041 |

* cited by examiner

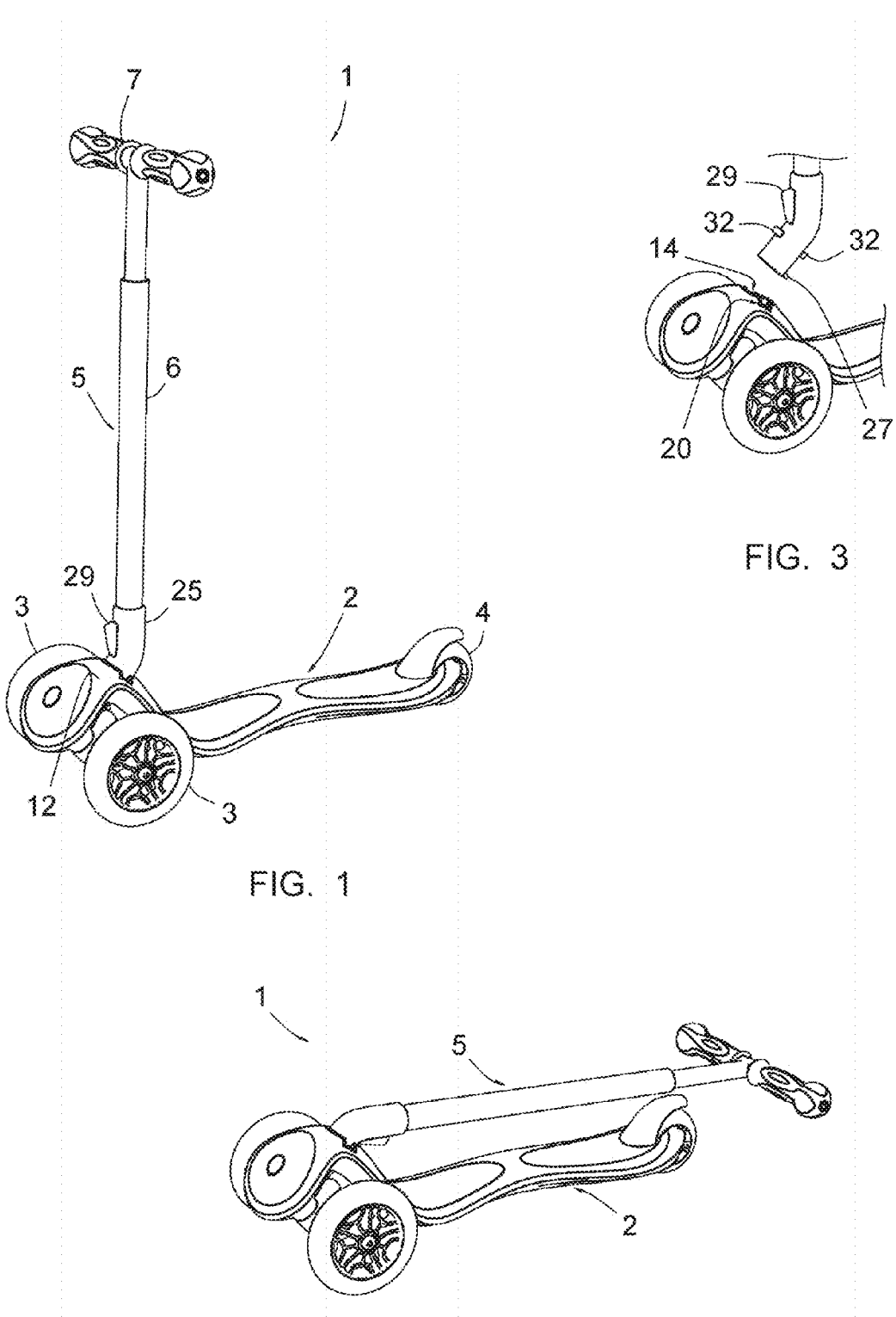

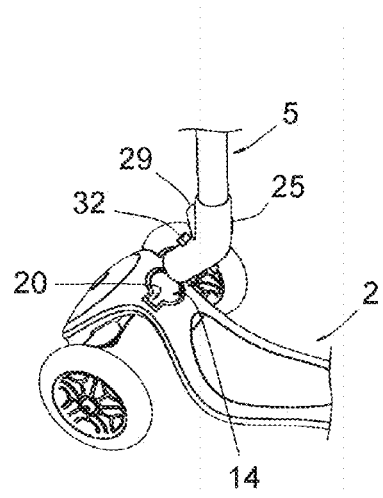
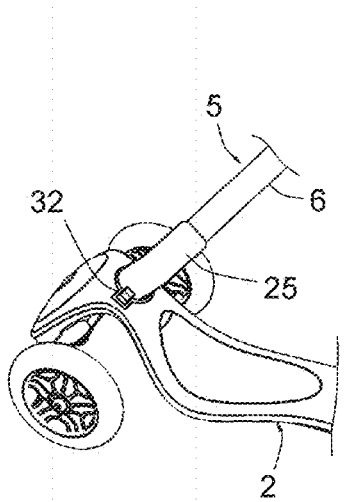
FIG. 4
FIG. 5
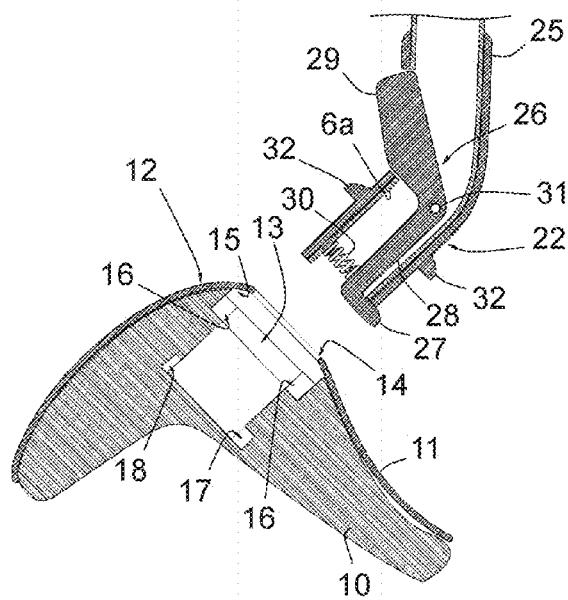
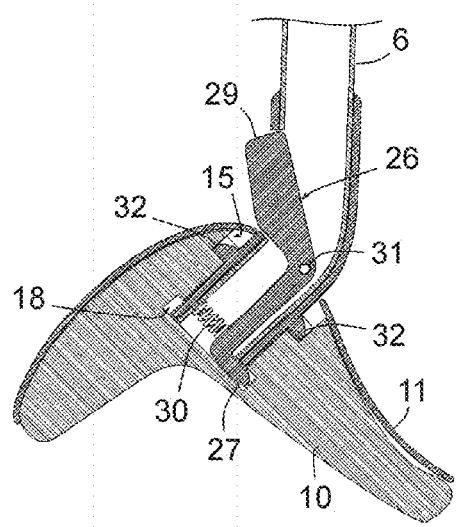
FIG. 6
FIG. 7

WHEELED VEHICLE, ESPECIALLY FOR CHILDREN

BACKGROUND OF THE INVENTION

The present invention relates to a wheeled vehicle, notably for children, which may mainly be used as a scooter.

As this is well known, a vehicle of the scooter type essentially comprises a platform equipped with front and rear wheels and a steering column, controlling the pivoting of the front wheel(s). Generally, the steering column is movable between an unfolding position, in which it protrudes upwards from the platform, by more or less forming a right angle with the latter, and a folding position, in which it extends along the platform. Also generally, the mobility of the steering column between these unfolding and folding positions is achieved by pivotally mounting the column on the platform, around an axis transverse to this platform, and maintaining this column in either one of these unfolding and folding positions is achieved by a device of a locking mechanism. This mechanism is notably of the type comprising two adjacent walls in a circular sector, provided with notches, and a transverse pin which will selectively engage in a pair of notches in each of the two aforementioned positions.

A mechanism of this kind has the drawback of being relatively complicated to manufacture, of having portions exposed to fouling and having portions which risk being relatively aggressive in the case of a fall.

The present invention has the main object of remedying this drawback.

This mechanism also has the drawback of not having an operation always very easy or very intuitive for a user.

The present invention also has the object of finding a remedy to this drawback.

This mechanism also has the drawback of only allowing a unique configuration of the vehicle, as a scooter, and therefore not allowing other possible configurations.

The present invention also has the object of finding a remedy to this drawback.

SUMMARY OF THE INVENTION

The vehicle according to the invention is equipped with front and rear wheels and comprising a platform forming a footboard and a steering column, the platform having front-rear plane and a rear, and extending in a plane; the steering column is movable between an unfolding position, in which it protrudes upwards from the platform, and a folding position, in which it extends along the platform; the vehicle comprises a mechanism for locking the steering column in said unfolding and folding positions;

the platform comprises a well of a general cylindrical shape, the axis of which is contained in said front-rear plane of the platform and is tilted towards the rear of this platform by forming an angle from 30° to 60° with the plane in which extends the footboard;

the steering column has a lower bent portion, connected to a cylindrical base on one end and to a remainder portion on the opposite end; the cylindrical base has an axis and is intended to be engaged into the well with pivoting capability in this well; the axis of the cylindrical base forms, with the axis along which the remainder portion of the steering column extends longitudinally, a complementary angle to 180° with the angle which the axis of the well forms; and the locking mechanism includes a first device for angularly blocking the base in the well, in a first angular position of this base in which the steering column is in an unfolding position, and a second device for angularly blocking the base in the well, in a second angular position of this base in which the steering column is in a folding position.

It will be understood that by the expression "front-rear plane", is meant the longitudinal plane of the platform which is substantially perpendicular to the plane in which extends the footboard which makes up the platform, i.e. a plane parallel to the one containing the axis of the wheels in the unfolding position.

It will also be understood that the terms of "front" and "rear" refer to the portions of the vehicle respectively located towards the front and towards the rear of the vehicle when this vehicle is used for moving around.

Thus, on the vehicle according to the invention, the steering column passes from the unfolding position to the folding position by pivoting said base in said well, between two substantially diametrically opposite angular positions; the respective angles according to which the well is tilted and according to which the steering column is bent give the possibility of obtaining the respective unfolding and folding positions of this steering column.

The vehicle in this way has a relatively simple structure, not having any portion exposed to fouling, and not comprising any portions which risk being relatively aggressive in the case of a fall. Further, the handling of the vehicle is very easy and very intuitive for a user.

Preferably, the angle formed by the axis of the well with the plane in which extends the footboard which makes up the platform is 45°, and therefore the angle which the axis of the cylindrical base forms with the axis according to which said remainder portion of the direction column extends longitudinally, is 135°.

Preferably, the vehicle also comprises a mounting/disassembling mechanism allowing mounting and disassembling of the steering column relatively to the platform; wherein the platform has a wall delimiting the well;

said mounting/disassembling mechanism comprises:

a groove made in said wall, co-axially with the well;

at least one radial protrusion made on the cylindrical base, able to be engaged into said groove and to slide into the latter during the movement of the steering column between the unfolding and folding positions; and an inlet allowing the engagement of said protrusion into said groove during the engagement of the cylindrical base into the well, this inlet being located at a distance from the first and second angular positions which the cylindrical base occupies in the well when the steering column is in either one of the unfolding and folding positions.

Thus, upon mounting the steering column on the platform, the base is engaged into the well while being angularly oriented so that said protrusion will face said inlet, and then this protrusion is engaged through this inlet as far as into said groove; the steering column is then pivoted towards either one of said unfolding and folding positions which moves the protrusion away from the inlet and thus allows the base to be retained in the well, and therefore the mounting of the steering column on the platform. The disassembling of the steering column with respect to the platform is carried out in a reverse way.

By means of this disassembling possibility, the vehicle may be used without a steering column, in order to form a kind of skateboard; the platform may also be combined with other elements, notably with a removable seat secured to a base able to be engaged into the well and therefore to be mounted on the platform; this seat may be straddled by a child, so that the platform may thus be transformed in a sort of wheeled horse, or, if the seat is connected to front handles, into a kind of "mini-motorcycle".

The first aforementioned blocking device and the second aforementioned blocking device may be formed by bolts radially positioned with respect to the well and sliding between positions for engagement with the base and for disengagement from this base.

According to a preferred embodiment of the invention, however, the first device for angularly blocking the base in the well are formed by:

a first radial accommodation made in the platform, opening into the well, and a locking finger movable between an engagement position into this first accommodation, in which it locks the steering column in said unfolding position, and a disengagement position relatively to this accommodation, in which it releases the pivoting of the steering column; the locking finger is associated with a spring urging it into said engagement position;

the second device for angularly blocking the base in the well are formed by:

a second radial accommodation made in the platform opposite to the first accommodation, opening into the well, and the locking finger, radially movable between a position for engagement into this second accommodation, wherein it locks the steering column in said folding position, and a disengagement position from this accommodation, in which it releases the pivoting of the steering column;

said groove communicates, at its bottom, with a third accommodation and a fourth accommodation diametrically opposite to each other, said third accommodation being able to receive said protrusion in said unfolding position and said fourth accommodation being able to receive said protrusion in said folding position;

the cylindrical base being able to adopt two axial positions in the well, i.e.:

a first axial lower position in which said protrusion is engaged into either one of said third and fourth accommodations and said locking finger is located at the same level as said first accommodation or said second accommodation, and a second axial upper position in which said protrusion is disengaged from this third or fourth accommodation and said locking finger is axially shifted relatively to said first accommodation and relatively to said second accommodation.

Thus, in the unfolding position of the steering column, the locking finger is engaged into said first accommodation by the elastic force exerted by the spring on it, and said protrusion is engaged into said third accommodation; in order to pass from this unfolding position to the folding position, the locking finger is brought into a disengagement position from the first accommodation and then traction is exerted on the base so as to extract said protrusion from the third accommodation and to bring this protrusion into the groove; the steering column is then able to be pivoted towards said folding position; during this pivoting movement, it is, except for the short passage of said protrusion facing the aforementioned inlet, retained relatively to the platform, which prevents separation of the steering column and of the platform; when the folding position is reached, the protrusion will face the fourth accommodation, which allows the base to fall back into said first axial position; the protrusion therefore falls into the fourth accommodation and the locking finger will face said second accommodation, in which it engages because of the urge exerted by the spring, which locks the steering column in this folding position.

Preferably, the locking finger is secured to a bent locking member, installed inside the lower portion of the steering column, this locking member being pivotally mounted on this steering column between said engagement and disengagement positions of the locking finger and having an actuation portion accessible to a user, through an opening made in the steering column.

Pressure on this actuation portion gives the possibility of bringing the locking finger in either one of the aforementioned engagement or disengagement positions, against the elastic force exerted on this finger by the spring.

BRIEF DESCRIPTION OF THE DRAWINGS

The invention will be better understood, and other features and advantages thereof will become apparent, with reference to the appended schematic drawing, described hereafter; this drawing illustrates as a non-limiting example a preferred embodiment of the relevant vehicle. In this drawing:

FIG. 1 is a perspective view of the vehicle, with the steering column in the unfolding position;

FIG. 2 is a view thereof similar to FIG. 1, with the steering column in the folding position;

FIG. 3 is a partial view thereof similar to FIG. 1, with the steering column in a disassembled state with regard to the platform with wheels which the vehicle comprises;

FIG. 4 is a partial perspective view thereof under another angle, also with the steering column in a disassembled condition;

FIG. 5 is a view thereof similar to FIG. 4, with the steering column being mounted on the platform; and FIGS. 6 to 11 are partial views thereof from the side, as a longitudinal sectional view and with a large scale, in five different positions of a mounting mechanism for the steering column on the platform and for controlling the pivoting of this column with respect to this platform.

DESCRIPTION OF THE PREFERRED EMBODIMENTS

Figure 8:
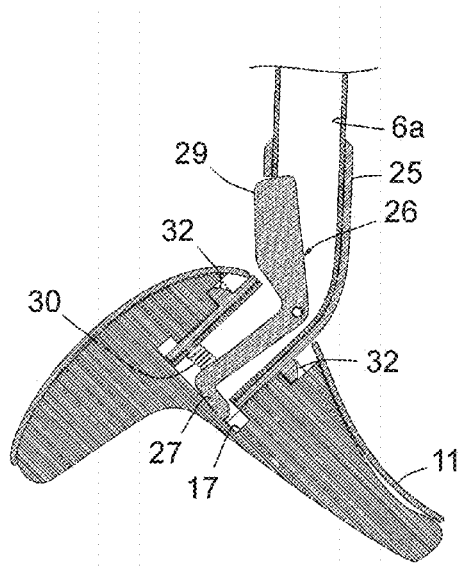

FIGS. 1 and 2 represent a wheeled vehicle 1, notably for children, which may mainly be used as a scooter but which may also adopt other configurations, as described later on.

The vehicle 1 essentially comprises a platform 2 equipped with front and rear wheels 3, 4, and a steering column 5, controlling the pivoting of said front wheel(s) 3. The steering column 5 includes an elongated portion 6 which may be adjusted in length, formed with two telescopic tubes, and a handlebar 7. It is movable between the unfolding position shown in FIG. 1, in which it protrudes upwards from the platform 2, by more or less forming a right angle with the latter, and a folding position shown in FIG. 2, in which it extends along the platform 2. The general portions of the vehicle 1 which have just been mentioned above are well known per se and will therefore not be described in more detail.

The platform 2 has a substantially planar central area, forming a footboard on which stands the user when the vehicle 1 is used. As this is visible in FIG. 6, it is formed with a structural body 10 and by a cover shell 11. The body 10 and the shell 11 form a front boss 12. In the body 10, at the rear area of this boss 12, is made a well 13 with a general cylindrical shape, the axis of which is, in a front-rear plane of the platform 2, tilted according to an angle of 45° towards the rear of this platform. The shell 11 forms an opening 14 facing this well 13. A groove 15 is made in the body 10 co-axially with the well 13, at the upper portion of the latter and just below the shell 11. This groove 15 has a greater diameter than that of the opening 14, so that it is delimited by the shell 11 in the upper portion.

The groove 15 communicates, at its lower portion, with two radial accommodations 16 diametrically opposite to each other. This groove 15 and these accommodations 16 are able to receive two diametrically opposite protrusions 32 which a base 22 comprises, formed by the steering column 5, as described later on.

At the lower portion of the well 13, are made two radial accommodations 17, 18 diametrically opposite to each other, which open into the well 13.

Further, the shell 11 forms two radial notches 20 opening into the opening 14 (only one of them is more particularly visible in FIG. 4). The protrusions 32 are able to be engaged into these notches 20, as visible in FIG. 5, as far as into the accommodations 16, as visible in FIG. 7.

The steering column 5 has a lower bent portion defining below it, a cylindrical lower base 22, the axis of which forms an angle of 135° with the axis along which extends the elongated portion 6 longitudinally.

With reference more particularly to FIG. 6, it appears that the lower base 22 is formed by the lower portion 6a of the elongated portion 6 and by a sleeve 25 which covers this lower portion. This sleeve 25 also covers said bent portion and the rectilinear lower portion of the portion 6 and is attached to these parts and portion.

These same parts and portion are tubular and accommodate a locking member 26 giving the possibility of controlling the mounting/disassembling and the locking of the steering column 5 on the platform 2. This member 26 comprises a lower locking finger 27, an intermediate branch 28 and an actuation portion 29. The finger 27 forms a right angle with the branch 28 and is intended to be engaged into either one of the accommodations 17, 18 as visible in FIGS. 7 and 11.

The branch 28 is urged by a spring 30 extending between it and said lower portion 6a, which normally holds the member 26 in the position shown in FIG. 6, in which the finger 27 radially protrudes beyond the wall of the sleeve 25 and is able to be engaged into either one of the accommodations 17 or 18. The spring 30 is however able to be compressed so that the finger 27 may be brought into the retracted position visible in FIG. 8, wherein it does not protrude beyond the wall of the sleeve 25 and is therefore disengaged from the accommodations 17 or 18.

The actuation portion 29 is bent with respect to the branch 28. In the position shown in FIG. 6, it protrudes through an opening made in the lower portion 6a and in said bent portion, as well as in the sleeve 25.

The locking member 26 is pivotally mounted with respect to this lower portion 6a and this sleeve 25 by a device of an axis 31 driven through the lower portion 6a and the sleeve 25. This axis 31 being substantially located between the branch 28 and the actuation portion 29.

The sleeve 25 comprises both aforementioned protrusions 32, secured to it, which are diametrically opposite to each other and which are positioned on a diameter parallel to the axis along which the finger 27 is movable with respect to the base 22.

As this is understood with reference to FIGS. 3 and 4, the steering column 5 is able to be separated from the platform 2 and to be mounted on the latter by engagement of the base 22 into the well 13. In order to achieve this mounting, as visible in FIG. 5, the steering column 5 is placed in an intermediate position between the unfolding and folding positions, and then a manual action is exerted on the actuation portion 29 so as to bring the finger 27 into the aforementioned retracted position, and the base 22 is engaged into the well 13. The protrusions 32 are in this same intermediate position, placed facing the notches 20; they are engaged through the latter, and then into the groove 15 and into the accommodations 16 as visible in FIG. 7. The action on the actuation portion 29 may be released as soon as the protrusions 32 engaged into notches 20. The steering column is pivoted either towards the unfolding position (FIG. 7), or towards the folding position (FIG. 11), and when either one of these positions is reached, the finger 27, under the action of the spring 30, penetrates into the accommodation 17 or the accommodation 18 depending on the case, thereby locking the steering column 5 in either one of these positions.

Figure 9:
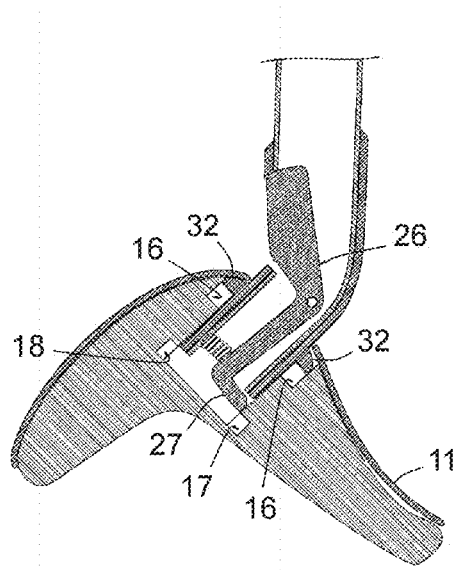
Figure 10:
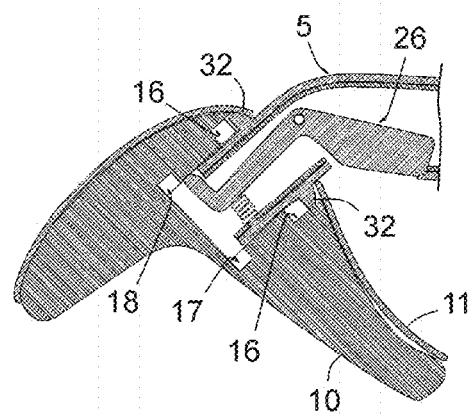
Figure 11:
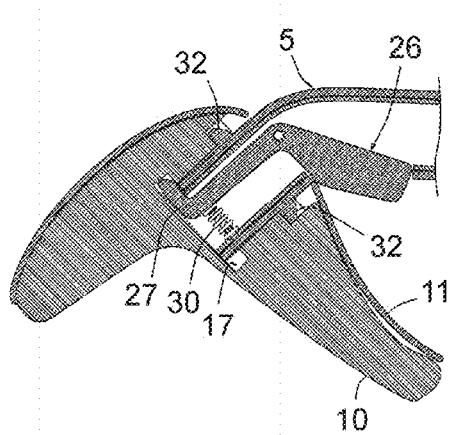

In order to pass from the unfolding position visible in FIG. 7 to the folding position visible in FIG. 11, the user exerts pressure on the actuation portion 29 so as to bring the locking member 26 into the retracted position shown in FIG. 8. By maintaining this pressure, it exerts axial traction on the base 22 so as to extract the protrusions 32 from the accommodations 16 and to bring these protrusions into the groove 15, as shown in FIG. 9. In this position, the finger 27 is brought above the accommodation 17, so that maintaining said pressure on the actuation portion 29 becomes unnecessary, and the protrusions 32 will abut against the shell 11, ensuring that an undesired extraction of the base 22 out of the well 13 cannot occur. The steering column 5 is then pivoted as far as the folding position shown in FIG. 10, until the protrusions 32 fall into the respective accommodations 16; the base 22 is thus brought into the lowered position shown in FIG. 11, wherein the finger 27 is placed facing the accommodation 18 and engages into this accommodation under the urging of the spring 30, which locks the steering column 5 in this folding position.

It thus appears from the foregoing that the invention provides a vehicle 1 having as regards the mounting/disassembling of the column 5, the determining advantages of having a relatively simple structure, of not having any portions exposed to fouling, and of not comprising portions which risk being relatively aggressive in the case of a fall.

The operation of the vehicle 1 for having the steering column 5 pass from the unfolding position to the folding position, and vice versa, is very easy and very intuitive for a user.

Further, by means of the possibility of easily and rapidly disassembling the steering column 5, the vehicle 1 may be used without any steering column 5, in order to form a sort of skateboard; the platform 2 may also be combined with other elements, notably a removable seat secured to a base able to be engaged into the well 13 and therefore to be mounted on the platform; this seat may be straddled by a child, so that the platform may thus be transformed into a kind of horse with wheels, or, if the seat is connected to front handles, into a kind of "mini-motorcycle".

What is claimed is:
1. A wheeled vehicle for children comprising:
a platform forming a footboard and a steering column, the platform having a front end and a rear end, the steering column is located at the front end of the platform and is movable between an unfolding position and a folding position, in the unfolding position the steering column protrudes upwards from the platform, and in the folding position the steering column extends along the platform;

a first wheel connected to the front end of the platform;

a second wheel connected to the rear end of the platform;

a locking mechanism for locking the steering column in said unfolding and folding positions;

wherein:

the platform comprises a well having a cylindrical shape, the well is located at the front end of the platform, the well is tilted towards the rear end of the platform by forming an angle from 30° to 60° in reference to the footboard;

the steering column has an upper portion and a lower bent portion the lower bent portion is connected to a cylindrical base on one end and to the upper portion of the steering column on the opposite end; the cylindrical base has an axis and pivotably engages into the well; the upper portion has an axis and the axis of the cylindrical base forms with the axis of the upper portion an angle being a complementary angle to a 180° with the angle which the well forms in reference to the footboard; and the locking mechanism comprises a first device for angularly blocking the base in the well, in a first angular position of the base when the steering column is in the unfolding position, and a second device for angularly blocking the base in the well, in a second angular position of the base when the steering column is in the folding position.

2. The vehicle according to claim 1, wherein the angle formed between the well and the footboard is 45°, and the angle formed between the cylindrical base and the upper portion of the steering column is 135°.

3. The vehicle according to claim 1, comprising a mounting/disassembling mechanism allowing mounting and disassembling of the steering column with respect to the platform, wherein:

the platform has a wall delimiting the well;

said mounting/disassembling mechanism comprises:

a groove made in said wall, the groove is co-axially with the well;

at least one radial protrusion made on the cylindrical base, the at least one radial protrusion engages into said groove and to slide in the groove during the movement of the steering column between the unfolding and the folding positions; and an inlet allowing engagement of said protrusion into said groove during the engagement of the cylindrical base into the well, the inlet being located at a distance from the first and the second angular positions occupied by the cylindrical base in the well when the steering column is in either one of the unfolding and the folding positions.

4. The vehicle according to claim 3, wherein:

the first device for angularly blocking the base in the well is formed by:

a first radial accommodation made in the platform, opening into the well, and a locking finger movable between an engagement position into this first accommodation, in which the locking finger locks the steering column in said unfolding position, and a disengagement position from the first accommodation, in which the locking finger releases the pivoting of the steering column; the locking finger is associated with a spring urging it into said engagement position;

the second device for angularly blocking the base in the well are formed by:

a second radial accommodation made in the platform opposite to the first accommodation, opening into the well, and the locking finger, the locking finger radially movable between an engagement position into the second accommodation, in which the locking finger locks the steering column in said folding position, and a disengagement position from the second accommodation, wherein the locking finger releases the pivoting of the steering column;

said groove communicates at a bottom section, with a third accommodation and a fourth accommodation diametrically opposite to each other, said third accommodation receives said protrusion in said unfolding position and said fourth accommodation receives said protrusion into said folding position;

the cylindrical base adopts two axial positions in the well:

a first axial lower position in which said protrusion is engaged into either one of said third and fourth accommodations and said locking finger is located at the same level as said first accommodation or said second accommodation, and a second axial upper position, wherein said protrusion is disengaged from the third or fourth accommodation and said locking finger is axially shifted with respect to said first accommodation and to said second accommodation.

5. The vehicle according to claim 4, wherein the locking finger is secured to a bent locking member, the bent locking member is installed inside the lower base of the steering column, the bent locking member being pivotally mounted on the steering column between said engagement and disengagement positions of the locking finger, and having an actuation portion accessible to a user, through an opening made in the steering column.

* * * * *